Jan. 15, 1963 SHO TAKAHAMA 3,073,221
PHOTOGRAPHIC LIGHT RESPONSIVE DIAPHRAGM MECHANISM
Filed Oct. 30, 1959
2 Sheets-Sheet 1
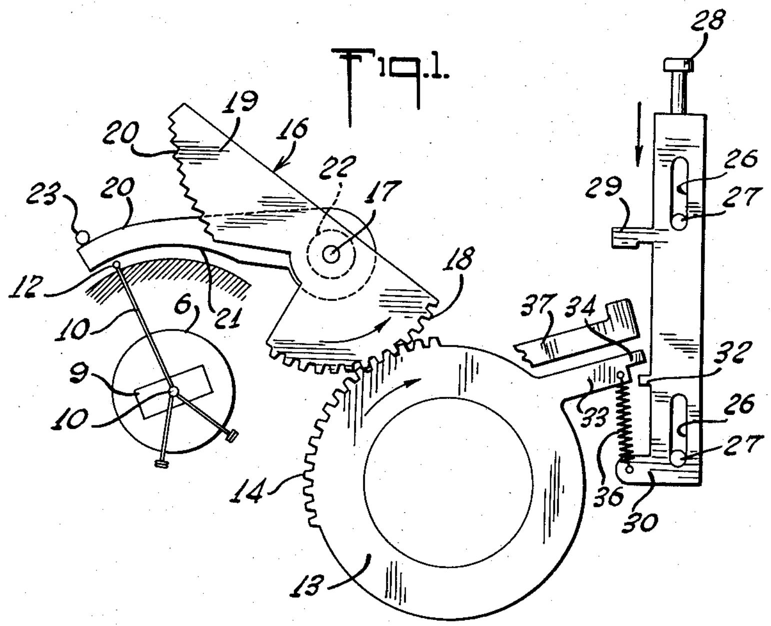
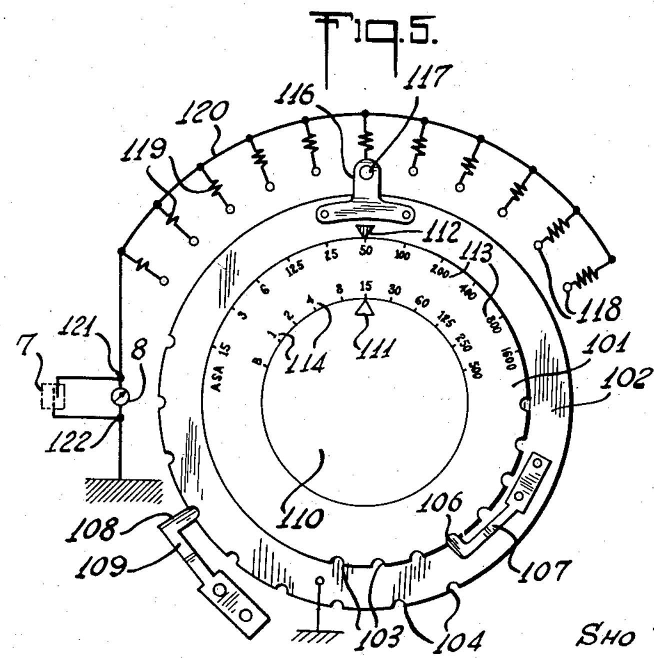
INVENTOR
SHO TAKAHAMA
BY Stanley Wolder
ATTORNEY

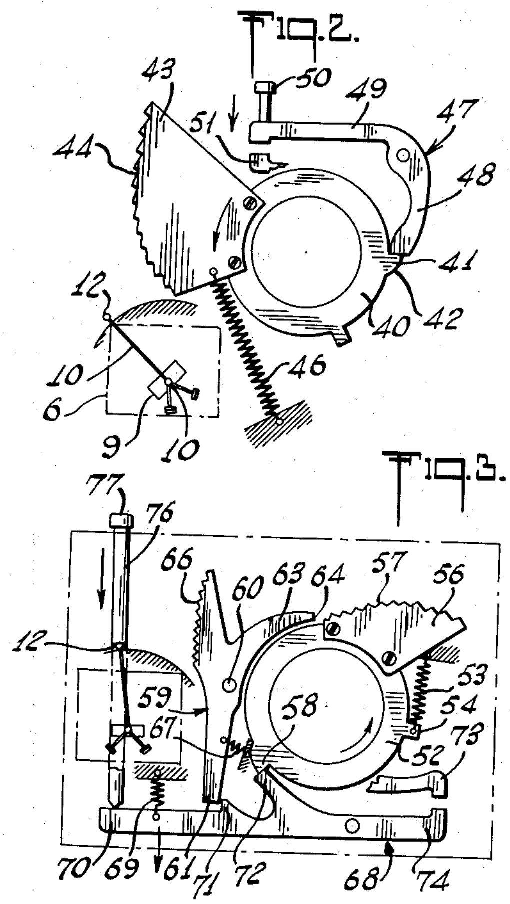
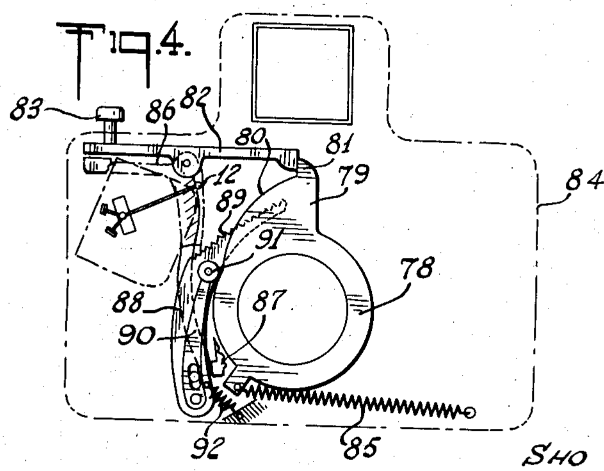
INVENTOR
SHO TAKAHAMA
BY Stanley Wolder
ATTORNEY 3,073,221

PHOTOGRAPHIC LIGHT RESPONSIVE DIAPHRAGM MECHANISM

Sho Takahama, Nishinomiya-shi, Japan, assignor to Yashica Co., Ltd., Tokyo, Japan, a corporation of Japan Filed Oct. 30, 1959, Ser. No. 849,954
Claims priority, application Japan Dec. 23, 1958
7 Claims. (Cl. 95—10)

The present invention relates generally to improvements in cameras and it relates more particularly to an improved automatic light responsive camera diaphragm mechanism.

In photographing an object it is necessary for optimum results to properly correlate the film speed, shutter speed, diaphragm aperture, and the light reaching the camera. Since, under normal outdoor conditions, the film speed is fixed and the light is not controllable it is the camera diaphragm aperture which is subject to the most frequent adjustment. Since the diaphragm aperture must be correlated to the other parameters its adjustment is time consuming and often inaccurate. There have been many types of automatic light responsive camera diaphragm mechanisms proposed and employed but these possessed many drawbacks and disadvantages and left much to be desired. They are usually not dependable and inaccurate and subject to frequent malfunctioning.

It is therefore a principal object of the present invention to provide an improved camera diaphragm actuating mechanism.

Another object of the present invention is to provide an improved automatic light responsive camera diaphragm mechanism.

Still another object of the present invention is to provide an improved automatic light responsive camera diaphragm mechanism wherein the diaphragm is not motivated by the light energized device.

A further object of the present invention is to provide an improved diaphragm mechanism of the above nature characterized by its ruggedness, accuracy and dependability.

The above and other objects of the present invention will become apparent from a reading of the following description taken in conjunction with the accompanying drawings wherein:

FIGURE 1 is a front elevational view, partially broken away, of a light responsive automatic camera diaphragm mechanism embodying the present invention;

FIGURE 2 is a front elevational view, partially broken away, of another embodiment, of the present invention;

FIGURE 3 is a front elevational view, partially broken away, of still another embodiment of the present invention.

FIGURE 4 is a front elevational view, partially broken away of a further embodiment of the present invention; and FIGURE 5 is a front elevational view, partially schematic of a sensitivity control device employed with the present mechanism.

In a sense the present invention contemplates the provision of an improved automatic light responsive camera diaphragm mechanism comprising a diaphragm control member having a surface movable along a first predetermined path between a retracted and advance position, a stop member movable along a second predetermined path intercepting said first path at different points to limit the advance movement of said diaphragm control member in accordance with the position of said stop member, and light energized motivating means positioning said stop member in accordance with the intensity of the energizing light.

According to a preferred form of the present invention the diaphragm control member includes a rack carrying a rotatable ring connected by way of a tension spring to a finger actuated plunger which resiliently rotates the ring and trips the camera shutter at the end of its stroke. The stop member is carried at the end of an arm extending laterally from a light meter armature. A diaphragm control lever and a locking arm are rotatably supported on a common pivot and are rotatably coupled by a friction slip washer. One end of the control lever carries a sector gear engaging the ring rack and the other end thereof has a curved serrated edge movable along and across the path of the stop member. As the control lever advances toward the stop member it moves the locking lever to engage the stop member and as it returns to its retracted positions it separates the locking lever from the stop member.

In another form of the present invention the serrated control lever is affixed directly to the diaphragm control ring which is spring urged to an advanced position and releasably locked in a retracted position. The locking lever is here dispensed with. According to a further modification a first control lever is spring urged to an advanced position and has a serrated edge movable across and along the path of stop member and carries a second stop member. The diaphragm ring carries an arm having a second serrated surface movable along and across the path of said second stop member and spring urged to an advanced position. Means are provided for latching the serrated lever and diaphragm ring in retracted positions and releasing them successively. This last embodiment may be further modified by replacing the second stop member by a cam follower and replacing the ring carried serrated arm by an arm having a cam surface engaging the follower. In this latter case the control lever is spring urged to a retracted position wherein the follower engages the cam.

Referring now to the drawings, and more particularly to FIGURE 1 thereof, the reference numeral 6 generally designates a light energized device of the conventional type including a photoelectric cell 7 (see FIGURE 5) and a sensitive electric current meter 8 provided with an armature 9 swingable to a position in accordance with the light incident on the photoelectric cell 7. The armature 9 carries an axially extending shaft 10 from which an elongated arm 11 projects radially and terminates in a stop element 12 which is moved to a position along an arcuate path as determined by the aforesaid incident light. The diaphragm control arrangement includes a diaphragm ring 13, rotation of which varies the diaphragm aperture in the conventional manner, the ring 13 having a rack 14 extending along the peripheral edge thereof.

A control lever 16 is rockably mounted on a pin 17 and includes a sector gear 18 engaging the rack 14 and an oppositely projecting leg 19. The leg 19 is provided with a serrated or stepped edge or surface 20 which, upon rotation of a lever 16, moves across and along the path of the stop member 12 and intersects it at different points, the counterclockwise movement of the lever 16 thus being limited by the position of the stop member 12 which engages the serrated surface 20. Also rockably mounted on the pin 17 is a braking arm 20 which has an arcuate undersurface 21 parallel to the path of the stop element 12. A slipping friction washer 22 registers with the pin 17 and is sandwiched between the confronting faces of the lever 16 and arm 20 so that the arm 20 follows the movement of the lever 16, its counterclockwise movement being limited by the abutment 23 disposed above the arm 20 adjacent its free end and its clockwise movement being limited by the stop member 12 which it engages and releasably locks in position.

Laterally and vertically offset relative to the control ring 13 is a vertically elongated plunger member having a longitudinally extending pair of slots 26 formed therein and slidably engaging corresponding pins 27. The plunger is provided with an upwardly projecting finger piece 28, upper and lower inwardly directed arms 29 and 30 respectively and an inwardly directed abutment 32 disposed between the arms 29 and 30. An arm 33 projects laterally from the ring 13 and terminates in a stop 34 lying in the path of the abutment 32 and is connected by way of a helical tension spring 36 to the lower arm 30. A shutter release lever 37 is disposed in the path of the arm 29 and is tripped by the arm 29 when the latter reaches its lowermost position.

In operation the plunger is depressed by means of the finger piece 28 to rotate the ring clockwise by way of the spring 36. The rack 14 rotates the lever 16 counterclockwise through the sector gear 18 and the brake arm 20 is driven into engagement with the stop element 12 by way of the washer 22 to lock the stop element 12 in the position set by the light energized means. The lever 16 continues its rotation until the serrated edge 20 engages the stop element 12 halting the rotation of the lever 16 and the ring 13 in a position determined by the position of the stop element 12 and hence the light intensity. The plunger continues its downward movement following the stopping of the ring 13, as aforesaid, to load the spring 36 and trip the shutter release lever 37 through the arm 29. Following the tripping of the lever 37 the various elements are returned to their original ready position by raising the plunger so as to rotate the ring 13 counterclockwise to its retracted position, the abutment 32 engaging the step 34 to effect such rotation.

In FIGURE 2 of the drawings which illustrates another embodiment of the present invention the stop element 12 is positioned by the light energized armature 9 in the manner of the previous embodiment. The diaphragm control ring is designated by the reference numeral 40 and is provided with a radially outwardly projecting detent 41 having a cammed trailing edge 42. A control plate or arm 43 is affixed to the diaphragm ring 40 and is provided with a serrated or stepped outer edge 44 which upon rotation of the ring 40 traverses a path intersecting the path of the stop member 12 at different points in accordance with the angular position of the ring 40. Upon the edge 44 reaching and engaging the stop element 12 the advance of the arm 43 and ring 40 is stopped at a position determined by the position of the stop element 12 and hence by the energizing light conditions. A helical tension spring 46 extends from the lower edge of the arm 43 to a suitable support to normally urge the arm 43 and ring 40 to an advanced position.

A release lever in the form of a bell crank 47 is rotatably mounted at its knee portion on a pivot vertically and laterally offset relative to the ring 40 and is spring urged in a clockwise direction. The crank 47 includes a depending arm 48 having a downwardly directed end face located in the path of the detent 41 to releasably engage the detent 41 and lock the ring 40 and arm 43 in a retracted position against the urging of the loaded spring 46. The crank 47 also includes a horizontal arm 49 the free end of which is provided with an upwardly directed actuating button 50. Disposed below the free end of the arm 49 and in the path thereof is a shutter release element which is engaged and depressed by the arm 49 as the latter reaches its lowermost position.

In operation, the button 50 is depressed swinging the arm 48 out of engagement with the detent 41. The loaded spring 46 contracts rotating the arm 43 and ring 40 counterclockwise to an advance position until the serrated edge 44 engages to stop element 12 as aforesaid and thereby setting the diaphragm aperture in accordance with the light conditions. Upon further depression of the button 50 the arm 49 trips the shutter release member 51 to snap the picture. The automatic diaphragm mechanism is reset by manually rotating the ring 40 clockwise to its retracted position, the detent cammed surface 42 swinging the arm 48 out of the path of the detent 41 which is then releasably locked by the arm 48. The spring 46 is thus loaded and the stop element is freed for movement by the armature 9. The above cycle may now be repeated.

Referring now to FIGURE 3 of the drawings which illustrates another embodiment of the present invention, the positioning of the stop element 12 is similar to that described above. The rotatable diaphragm control ring 52 is urged counterclockwise to an advanced position by a tension spring 53 extending from a ring carried lug 54 to a suitable stationary support. Mounted on and extending outwardly from the ring 52 is a diaphragm control member defining arm 56 having a serrated outer edge 57 which defines a cam surface and which is movable with the ring 52 between a retracted and an advance position. A detent 58 having a cammed trailing edge is located on the periphery of the ring 52.

A transfer member defined by a lever 59 is rockably supported by a pivot 60 between the ring 52 and the path of the stop element 12 and includes a depending leg 61, a laterally upwardly extending leg 63 whose terminus defines a detent element 64, and an upwardly directed leg having a laterally facing cam surface defining serrated edge 66. A tension spring 67 extending from the leg 61 to a suitable support, urges the lever 59 from its illustrated retracted position counterclockwise to an advance position along a path intersecting the path of the stop element 12 at different points thereof.

Rockably supported by an intermediately disposed pivot below the ring 52 and lever 59 is a horizontally extending latching lever 68 urged to its clockwise latch position by a tension spring 69 connected to an arm 70 of the lever 68. Located on the arm 70 are a pair of upwardly directed laterally spaced detents 71 and 72 which lie in the paths of the lever leg 61 and ring detent 58 respectively and are movable out of said paths upon depression of the arm 70, the leg 61 being disengaged before the disengagement of the detent 58. A shutter release member 73 lies above and in the path of the opposite arm 74 of the lever 68. A vertically slidable plunger provided with an accessible button 77 engages the upper free end of the lever arm 70.

Upon depression of the button 77 and plunger 76 the lever 68 is rotated counter-clockwise. The leg 61 is first released by the detent 71 and the lever 59 swung by the tension spring 67 until the serrated edge 66 engages the stop element 12 to correspondingly locate the detent element 64. The detent 58 is then released by the detent 72 and the ring 52 and arm 57 swung by the spring 53 counterclockwise until the serrated edge 57 engages the detent element 64 thus positioning the diaphragm ring 52 in accordance with the position of detent element 64 and in turn stop element 12 and hence in accordance with the light conditions. Thereafter the arm 74 engages and actuates the shutter release member 73. In resetting the diaphragm mechanism the ring 52 and lever 59 are merely rotated clockwise, by any suitable means, not shown, until they are locked in their retracted positions by the detents 71 and 72.

In the embodiment of the present invention illustrated in FIGURE 4 of the drawing the stop element 12 is light motivated in the manner above set forth and the diaphragm control ring 78 is urged counterclockwise to an advance position by a tension spring 85 engaging a lug carried by the ring 78. A diaphragm control member defining arm 79 projects laterally from and is formed integral with the ring 78 and is provided with a peripheral cam surface defining curved edge 80 extending upwardly and rearwardly and terminating in a detent member 81. Releasably locking the ring 78 in a retracted position is an end of a centrally pivoted rockable lever 82 which engages the detent 81, and is spring urged to a latching position, the other end of the lever 82 carrying a button 83 projecting above the camera housing 84. A bell crank 86 is pivoted at its knee portion and has a horizontal leg with an end located in the path of the button end of the lever 82 and a vertical leg swingable into actuating engagement with a shutter release element 87.

A transfer lever 88 is pivoted at its lower end and projects upwardly and has a cam surface defining elongated serrated edge 89 extending to its free end. An arm 90 is affixed at its lower end to the lower end of the lever 88 and is rockable therewith and extends along the lever 88 and carries at its free end a detent element defining cylindrical cam follower 91. A tension spring 92 engages the arm 90 and urges the arm 90 and lever 88 clockwise to a retracted position with the follower 91 engaging the cam surface 80.

In operation the lever 82 is rocked counterclockwise by depressing the button 82 to disengage the detent 81 and release the ring 78. The ring 78 is rotated counterclockwise by the spring 85, the cam surface 80 engaging the follower 91 to move it therewith and rotate the transfer lever 88 and arm 90 until the serrated surface 89 engages the stop element 12 halting further advance of the lever 88, arm 90, follower 91, arm 79 and ring 78. Thus, the position of the ring 78 is determined by the position of the stop element 12 and hence the light conditions. During the advance of the arm 90 the spring 92 is loaded. Upon further depression of the button 83 the bell crank 86 is rocked by the lever 82 to actuate the shutter release 87 and snap the picture. In resetting the diaphragm mechanism the lever 88 is manually swung clockwise, by suitable means, not shown, to rotate the ring 78 clockwise by reason of the follower 91 acting on the cam surface 80 until the detent 81 is releasably latched by the lever 82. The spring 85 is thus loaded and the spring 92 relieved.

It is important to note that in each of the embodiments of the invention the stop element 12 is freely movable prior to the actuation of the diaphragm mechanism thus minimizing the load on the light energized stop element positioning means.

Referring now to FIGURE 5 of the drawing wherein there is illustrated an arrangement for adjusting the sensitivity of the stop member driving light energized device 6, there are provided a pair of superimposed concentric inner and outer discs 101 and 102 respectively, rotatably mounted on an accessible portion of the camera. The inner disc 101 has a plurality of regularly spaced recesses 103 formed in the peripheral edge thereof and the outer disc 102 has a plurality of regularly spaced recesses 104 formed in its peripheral edge, the angular spacing of the recesses 103 being the same as the angular spacing of the recesses 104. A detent element 106 carried on a spring arm 107 mounted on the outer disc 102 releasably engages selected recesses 103 and a detent element 108 carried on a spring arm 109 affixed to the camera body member releasably engages selected recesses 104. Thus the disc 102 may be releasably locked in a selected position and the disc 101 may be releasably locked in a selected position relative to the disc 102. A stationary disc 110 is mounted concentric with the discs 101 and 102 and is of smaller diameter than the inner disc 101 and carries an indicator 111 extending to the periphery of the disc 110. An indicator 112 is impressed on the outer disc 102 and is directed to the periphery of the inner disc 101. Indicia 113, corresponding to ASA film speeds and logarithmically graduated are located along the periphery of the inner disc 101 and are angularly spaced equal to the spacing of the recesses 103 and 104. Similarly, indicia 114 corresponding to shutter speeds and logarithmically graduated are located on the inner disc 101 along the periphery of the stationary disc 110 and are also angularly spaced equal to the spacing of the recesses 103 and 104.

Mounted on the peripheral border of the outer disc 102 is an outwardly radially directed arm 116 carrying a wiper member or brush 117. Extending along the arcuate path of the brush 117 and cooperating therewith are a plurality of contact elements 118 which are regularly angularly spaced equal to the angular spacing of the recesses 103 and 104. A plurality of resistors 119 of successively varying resistance values are connected between a line 120 connected to a terminal 121 of the meter 8 and the respective contact elements 118. The brush 117, in turn is connected by way of the disc 102 and ground to the other terminal 122 of the meter 8.

In employing the sensitivity adjusting mechanism described above the discs 101 and 102 are rotated to bring the selected shutter and film speed indicia 114 and 113 into registry with the corresponding indicators 111 and 112 which will move the brush into engagement with a corresponding contact element 118. This will shunt the meter 8 with a respective resistor 119, adjusting the sensitivity of the meter, in accordance with the resistance of the resistor and hence the properly combined values of the shutter and film speeds. The values of the resistors, which depends on the meter's absolute sensitivity, may be readily determined by one skilled in the art.

While there has been described and illustrated preferred embodiments of the present invention it is apparent that numerous alterations, omissions and addiitons may be made without departing from the spirit thereof.

What is claimed is:

1. An improved automatic light responsive camera diaphragm mechanism comprising a light energized meter having a rotatable armature carrying a laterally extending arm terminating in a stop element movable along an arcuate path, a rotatable diaphragm control ring, a rockably mounted lever having a first serrated edge movable along and across the path of said stop element and carrying a detent element, an arm mounted on and rotatable with said ring and having a second serrated edge movable along and across the path of said detent element, spring means normally urging said lever to an advanced position wherein its serrated edge engages said stop element, spring means normally urging said ring to an advanced position wherein said second serrated edge engages said detent element, and means releasably latching said lever and ring in retracted positions.

2. An automatic light responsive diaphragm control mechanism comprising a light energized device, a stop element movable along a predetermined path to a position in accordance with the intensity of the light incident upon said light energized device, a diaphragm control member movable between an advanced and a retracted position and provided with a cam surface movable therewith along a predetermined path, a transfer member movable between an advanced and a retracted position and having a cam surface movable therewith along a predetermined path intersecting the path of said stop element at different points thereof and having a detent element movable therewith along a predetermined path intersecting at different points thereof the path of said diaphragm control member cam surface to regulate the position said diaphragm control member.

3. A mechanism according to claim 2 including means for adjusting the light sensitivity of said light energized device.

4. A mechanism in accordance with claim 3 wherein said light energized device comprises an electric current meter having a movable armature coupled to said stop element and a photoelectric cell connected to said meter and said sensitivity adjusting means comprises a variable resistance device connected across said meter, and means for controlling the resistance thereof including a pair of movable members carrying associated film speed and shutter speed indicia and registering indicators.

5. An automatic light responsive diaphragm control mechanism comprising a light energized device, a stop element movable along a predetermined path to a position in accordance with the intensity of the light incident upon said light energized device, a diaphragm control member movable between an advanced and a retracted position, a transfer member movable between an advanced and a retracted position and having a cam surface movable therewith along a predetermined path intersecting the path of said stop element at different points thereof and having a detent element movable therewith along a predetermined path intersecting the path of said diaphragm control member to regulate the position thereof, spring means urging said diaphragm control member and said transfer member to their advanced positions, and latching means releasably locking said diaphragm control member and said transfer member in their retracted positions.

6. A mechanism according to claim 5 wherein said diaphragm control member is provided with a cam surface movable therewith along a predetermined path intersecting the path of said detent element along different points thereof, said diaphragm control member cam surface being defined by a serrated edge adapted to engage said detent element.

7. A mechanism according to claim 5 including a shutter release member actuated upon the advance of said diaphragm control member.

References Cited in the file of this patent

UNITED STATES PATENTS

| | | |
|---|---|---|
| 2,061,909 | Karg | Nov. 24, 1936 |
| 2,241,020 | Nerwin | May 6, 1941 |
| 2,242,013 | Martin | May 13, 1941 |
| 2,278,338 | Tonnies | Mar. 31, 1942 |
| 2,868,095 | Gebele | Jan. 13, 1959 |
| 2,923,216 | Greger | Feb. 2, 1960 |
| 2,925,760 | Broschke | Feb. 23, 1960 |